(12) United States Patent
Rogers

(10) Patent No.: US 11,957,118 B2
(45) Date of Patent: Apr. 16, 2024

(54) MULTIPOINT WEARABLE FISHING ROD HOLDER

(71) Applicant: Paul C. Rogers, East Amherst, NY (US)

(72) Inventor: Paul C. Rogers, East Amherst, NY (US)

( * ) Notice: Subject to any disclaimer, the term of this patent is extended or adjusted under 35 U.S.C. 154(b) by 87 days.

(21) Appl. No.: 17/740,736

(22) Filed: May 10, 2022

(65) Prior Publication Data

US 2022/0354101 A1  Nov. 10, 2022

Related U.S. Application Data

(60) Provisional application No. 63/186,341, filed on May 10, 2021.

(51) Int. Cl.
*A01K 97/10* (2006.01)
*A45F 5/02* (2006.01)

(52) U.S. Cl.
CPC .............. *A01K 97/10* (2013.01); *A45F 5/02* (2013.01); *A45F 2200/0566* (2013.01)

(58) Field of Classification Search
CPC .............. A01K 97/10; Y10S 224/922; A45F 2200/0566; A45F 2005/006; B65D 63/00; B65D 63/02; B65D 63/12; B65D 63/18; B65D 2563/00; Y10T 24/149
USPC ........................................................ 224/922
See application file for complete search history.

(56) References Cited

U.S. PATENT DOCUMENTS

| | | | | |
|---|---|---|---|---|
| 520,053 A | * | 5/1894 | Hopkins | A45F 5/00 |
| | | | | 24/537 |
| 1,922,594 A | * | 8/1933 | Lippstadt | A45D 31/00 |
| | | | | 24/3.13 |
| 4,877,166 A | * | 10/1989 | Gelinas, Jr. | A63B 57/20 |
| | | | | 206/315.9 |
| 6,129,251 A | | 10/2000 | Lajoie | |
| 7,013,596 B1 | * | 3/2006 | Moore | A45F 3/14 |
| | | | | 224/920 |
| 7,594,354 B1 | | 9/2009 | Chadwick | |
| D605,851 S | | 12/2009 | Drake | |
| 8,806,723 B2 | * | 8/2014 | Martinson | B65D 63/00 |
| | | | | 24/3.12 |
| 9,737,063 B2 | | 8/2017 | Holzer | |
| 9,763,435 B2 | | 9/2017 | Schultz | |
| 11,091,305 B2 | * | 8/2021 | Martinson | B65D 63/04 |
| 2007/0044366 A1 | * | 3/2007 | Walko | A01K 97/10 |
| | | | | 43/21.2 |

* cited by examiner

*Primary Examiner* — Adam J Waggenspack
(74) *Attorney, Agent, or Firm* — Michael J. Berchou, Esq.; Harter Secrest & Emery LLP

(57) ABSTRACT

An apparatus and method for a multipoint, flexible fishing rod holder that may be quickly and efficiently engaged and disengaged is disclosed. Both the rod handle and rod blank may be supported by separate flexible devices that accommodate all sizes and styles of fishing rod such that the rod may be maintained in a generally horizontal orientation. In one embodiment, the supporting apparatus can be retrofitted to existing fishing apparel. In another, the supporting apparatus is integral to the apparel at the time of manufacture. In certain aspects, the rod holder can be quickly engaged and disengaged to allow an angler use of both hands to facilitate various activities such as changing lures, adding bait, positioning bobbers, or wading with a staff.

2 Claims, 5 Drawing Sheets

MULTIPOINT WEARABLE FISHING ROD HOLDER

RELATED APPLICATIONS

This application claims the benefit of priority under 35 U.S.C. § 119 of U.S. Provisional Application Ser. No. 63/186,341 filed on May 10, 2021, the contents of which are relied upon and incorporated herein by reference in their entirety as if fully set forth below.

TECHNICAL FIELD

The invention relates generally to fishing equipment, apparel and related accessories and, more particularly, to a novel fishing rod holder.

BACKGROUND

During the fishing process, anglers frequently engage in various tasks and activities that require the use of their hands. These activities can include: trimming line, changing lures, adding bait, adding weight, adjusting bobber/float locations etc. To engage in these activities, the angler needs use of one or both hands, as well as supporting accessories. Holding the rod while attempting to engage in these other tasks and activities is cumbersome for an angler on shore or in a boat, and is especially difficult for fly-fishermen or other anglers who are wading in the water while fishing, as they have no ability to set down their fishing rod on another surface to free up both of their hands. Wading anglers are often standing in water above their waist and as high as their chest. The scenario, of having no viable location to set down a fishing rod, plays out on streams and lakes regularly, and anglers often resort to supporting their rods under their arm, in their teeth or balanced in one palm while trying to use their fingers independently to accomplish their tasks.

Traditional wading, shore bound, and boat anglers have several different types of apparel that are worn when in pursuit of their fishing hobby. This apparel includes, but is not limited to, waterproof waders, fishing vests, chest packs, suspenders, wader belts and fishing coats or jackets.

Existing fishing rod holders are not adapted to provide a multipoint wearable apparatus that affords the angler the use of both hands, while maintaining the rod in a desired/generally horizontal orientation thereby eliminating the risk of the rod or reel becoming immersed in the water or contacting dirt, sand and grime on the ground which can lead to equipment failure.

Fishing rods with reels have many different sizes and styles. The configuration of spinning rods, spin casting rods, bait casting rods and fly rods all have different characteristics of reel position, handle length, rod length, diameter and balance point.

The existing art does not accommodate all sizes or styles of rod while providing a balanced solution for maintaining hands free support of the rod in a horizontal position highly enough above the water to prevent unintentional immersion of the rod or reel. The existing art does not teach a method of utilizing a multipoint wearable flexible apparatus that enables an angler to quickly and efficiently engage and disengage such fishing apparatus on any style, size and type of fishing rod.

BRIEF SUMMARY OF THE INVENTION

With parenthetical reference to corresponding parts, portions or surfaces of the disclosed embodiment, merely for the purposes of illustration and not by way of limitation, the present disclosure broadly comprises an apparatus and method for providing a wearable, flexible, multipoint hands free fishing rod holder that may be quickly and efficiently engaged and disengaged. The apparatus can be added to existing apparel, or integral to the apparel design to provide at least two points of support, which allows the angler flexibility in determining the proper location of the support points based upon rod type, style and configuration.

The disclosed fishing rod apparatus can be adapted to be part of or attached to traditional fishing apparel as an added capability or as an integral part of the apparel design. The novel rod holder includes a flexible securing device (102, 202, 206) that provides the ability to accommodate any size/style of fishing rod, be unobtrusive to the angler when not in use, and is a multipoint system to secure the rod in a generally horizontal orientation. This disclosure also describes a method for using said apparatus that is capable of being quickly engaged and disengaged. In one aspect of the invention, an improved fishing rod holder is configured and arranged for attachment to an article of apparel. In one embodiment, the fishing rod holder comprises an elongated semi-rigid wrap within an elongated non-slip waterproof sleeve (102, 601, 602); a first connector (101, 201, 205) such as a slip ring for connecting the semi-rigid wrap to an article of apparel (203, 303) such that the non-slip waterproof sleeve acts as a supporting connection point between a fishing rod and an article of apparel. In other aspects, the semi-rigid wrap within the non-slip waterproof sleeve is of sufficient length to be wrapped around a portion of a fishing rod; is flexible such that it may be wrapped around a portion of a fishing rod; and is configured and arranged to support the weight of a fishing rod and reel. In one embodiment, the fishing rod holder includes a second connector for connecting a second elongated semi-rigid wrap within an elongated non-slip waterproof sleeve to the article of apparel so as to provide two supporting connection points for a fishing rod. The semi-rigid wrap with non-slip waterproof sleeve may be integrated in said article of apparel at the time of manufacture. In one embodiment, the semi-rigid wrap is a solid core wire having a thickness of at least 1 mm, and may be non-corrosive. In certain aspects, the non-slip waterproof sleeve is made of rubber, silicone or polyurethane; and/or is at least 6 inches in length. In another aspect of the invention, the fishing rod holder includes a flexible, solid core wire within an elongated non-slip waterproof sleeve; means for connecting the solid core wire within an elongated non-slip waterproof sleeve to an article of apparel such that the non-slip waterproof sleeve acts as a supporting connection point between a fishing rod and said article of apparel; and means for wrapping the solid core wire within a non-slip waterproof sleeve around a portion of a fishing rod. Another aspect of the invention includes a method of securing a fishing rod to a multipoint fishing rod holder apparatus, comprising the steps of: providing a fishing rod; holding the fishing rod in a horizontal orientation with a first hand; providing a flexible, elongated semi-rigid wrap within an elongated non-slip waterproof sleeve, wherein the semi-rigid wrap within a non-slip waterproof sleeve is of sufficient length to be wrapped around a portion of the fishing rod; utilizing the other hand to wrap the semi-rigid wrap completely around a portion of the fishing rod in a vertical plane, forming a vertical loop; utilizing the other hand to wrap the semi-rigid wrap within a non-slip waterproof sleeve completely around itself in the horizontal plane above the vertical loop of the handle or blank; holding the fishing rod in a horizontal orientation; utilizing the first hand to wrap another semi-rigid wrap within a non-slip waterproof sleeve completely around a different portion of the fishing rod in the vertical plane, forming a vertical loop; and utilizing the second hand to wrap the semi-rigid wrap within a non-slip waterproof sleeve completely around itself in the horizontal plane directly above the vertical loop, such that the fishing rod remains suspended when hands holding said fishing rod are released. In another aspect, the method includes grasping the fishing rod in one hand; utilizing the other hand to unwrap the semi-rigid wrap within the non-slip waterproof sleeve from a blank portion of the fishing rod; switching hands to hold the fishing rod in the other hand; utilizing the first hand to unwrap the semi-rigid wrap within non-slip waterproof sleeve from a handle of the fishing rod; and repeating said unwrapping until all semi-rigid wraps within said non-slip waterproof sleeves are disconnected from said fishing rod.

DETAILED DESCRIPTION OF THE EMBODIMENTS

Figure 1:
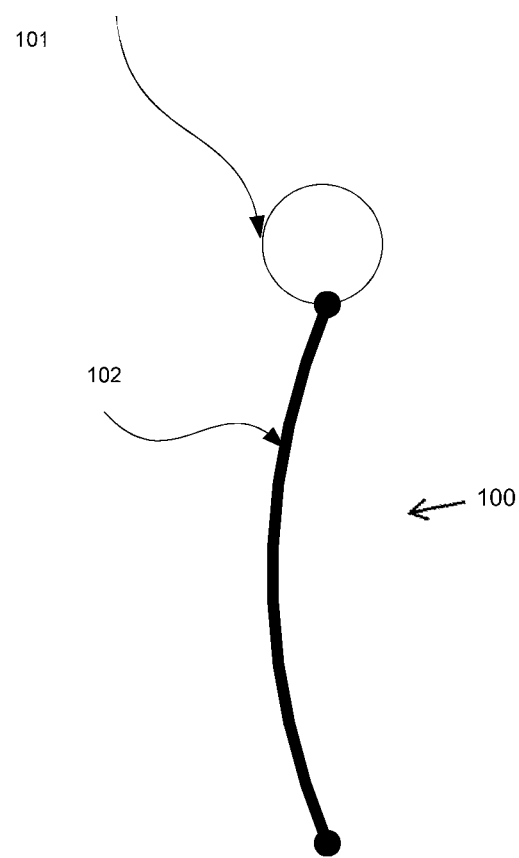
FIG. 1 illustrates one embodiment of a component end device for providing a flexible support point to the fishing rod.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Generally, a preferred embodiment of the novel rod holder comprises a support apparatus that connects to or is an integral part of fishing apparel, that combine to provide a multipoint support system to secure a fishing rod in a generally horizontal orientation, thereby freeing both of the angler's hands to engage in additional fishing related activities, such as but not limited to, changing lures, clipping line, adjusting bobber/float depth, adding split shot weights etc. The support apparatus can be added to existing fishing apparel post manufacture or integral in the design and manufacture as a valuable improvement to the functionality of fishing apparel.

When engaged, one embodiment of the apparatus supports multiple points of the rod from the bottom surface, and does not rely on a cantilever aspect which would concentrate the stress on a single point of the fishing rod and possibly lead to damage of high modulus fishing rod blanks. When not in use, the apparatus lays generally flat against the fishing apparel so as not to obstruct fishing activities.

In use, the angler using the novel rod holder can quickly and efficiently engage and disengage the rod from the rod holder, and when disengaged leave the apparatus in a state that is unobtrusive to other fishing tasks.

Referring now to the drawings, FIG. 1 illustrates the terminal portion of a single support device 100. The support device in this embodiment contains a length of flexible semi-rigid wrap that is enclosed within a non-slip waterproof sleeve 102 that directly contacts the fishing rod. The semi-rigid wrap and non-slip waterproof sleeve 102 has both a cushioning and gripping quality that helps secure the rod and keep it from moving when engaged, and additionally protects the rod from damage. The semi-rigid wrap with non-slip waterproof sleeve 102 plays an important role in the multipoint rod holder's ability to adapt to any size, shape and style of rod blank, handle and reel.

In this embodiment, the underlying semi-rigid wrap and non-slip waterproof sleeve 102 is of a sufficient length so as to provide the ability to wrap around the rod in any location, along with the strength to hold the rod in a stationary position. For example, a 6-inch semi-rigid wrap is sufficient to wrap around any rod with a handle of up to 1.5 inches in diameter. The semi-rigid wrap, for example, may be between 4 inches and 20 inches in length. A split ring or other connection device 101 may be used to secure the semi-rigid wrap and non-slip waterproof sleeve 102 to the apparel. It is common for fishing apparel to have built in connection points such as D rings, fabric loops, grommets, drawstrings, clips etc. that provide the capability to add the support apparatus from FIG. 1 to existing apparel.

Figure 2:
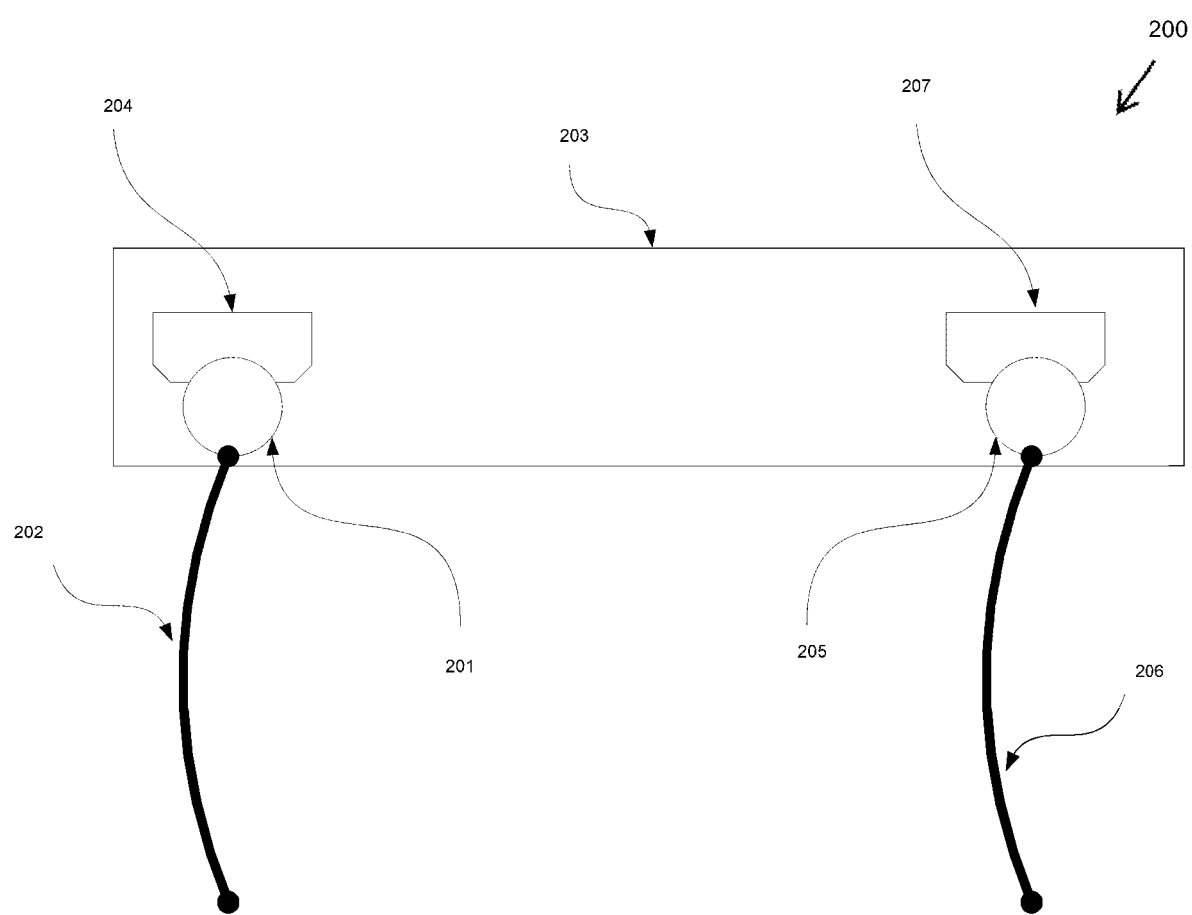
FIG. 2 illustrates one embodiment of a multipoint support apparatus attached to an item of fishing apparel when not engaged.

FIG. 2 shows an example of two support apparatus 200 attached to an item of fishing apparel 203 at points 204 and 207 with the semi-rigid wrap and non-slip waterproof sleeve 202 and 206 not engaged. As seen, the semi-rigid wrap and non-slip waterproof sleeve 202 hangs generally straight down from the connection device 201 such that it essentially lies flat against the apparel. This keeps the rod holder support apparatus from interfering with fishing activities when not in use.

Figure 3:
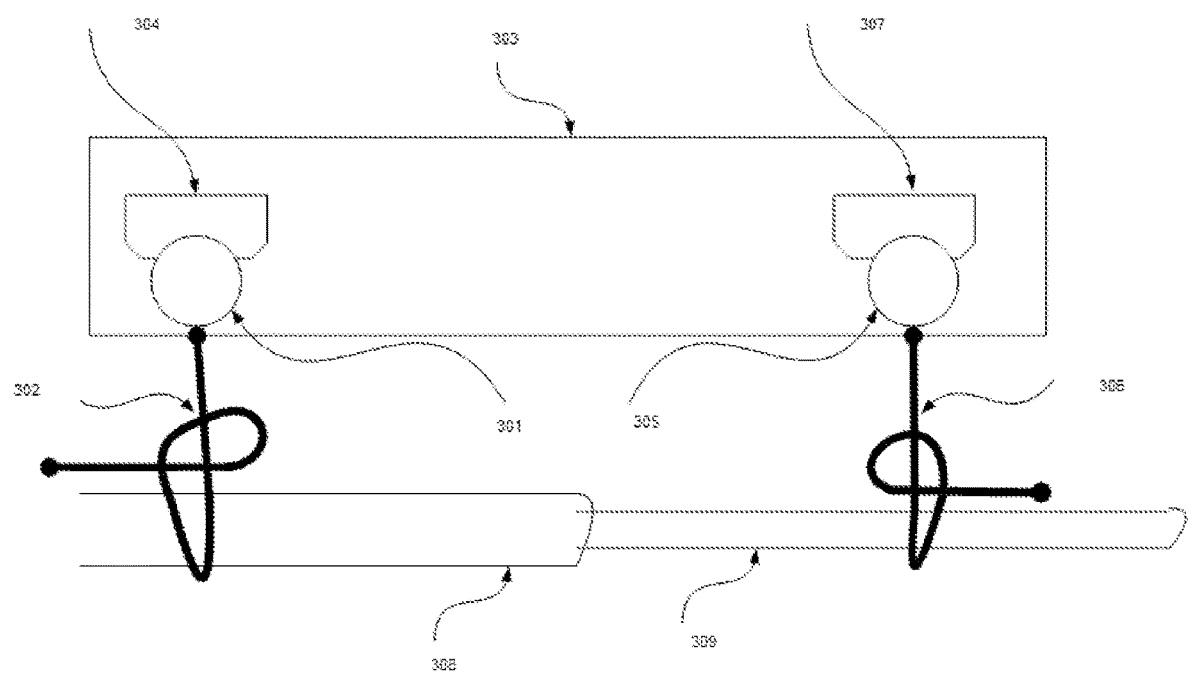
FIG. 3 illustrates one embodiment of a multipoint support apparatus attached to an item of fishing apparel when engaged.

FIG. 3 shows an example of a multipoint support apparatus attached to an item of fishing apparel 303 at locations 304 and 307 with the semi-rigid wrap and non-slip waterproof sleeve 302 and 306 engaged to support a fishing rod handle 308 and rod blank 309, respectively. FIG. 3 shows the semi-rigid wrap and non-slip waterproof sleeve 302 and 306 providing support to the rod handle 308 and blank 309 from the bottom so as not to cause unnecessary stress on any single point of the rod that would be present if the apparatus employed any kind of cantilever aspect.

Several aspects of the engaged rod holder support apparatus are illustrated in FIG. 3. The first aspect is that the support apparatus must be capable of providing sufficient support for the weight of the rod. Newton's $2^{nd}$ law is the basis for understanding the worst case load on any single point on the support apparatus.

F=Mass×Acceleration

In the case of an engaged support apparatus, the worst case Mass is simply equal to the Mass of the entire rod and reel combination and Acceleration is the force of gravity, a constant. This calculation is equivalent to the weight of the rod. It is simple to ensure that the semi-rigid wrap itself has a weight bearing/holding capacity sufficient to prevent any linear deformation of the underlying semi-rigid wrap. Most solid core wires come with a specific holding capacity rating as part of their operating parameters. For example, a semi-rigid wrap with a holding capacity rating of 3 pounds requires a solid core wire of only 1 mm.

Another aspect of the engaged apparatus is that it must eliminate or reduce the possibility that it could unintentionally return to the disengaged state, thereby risking submersion of the rod or reel. This aspect of the support apparatus is satisfied by employing the examplary wrapping of the semi-flexible wrap and waterproof sleeve 302, 306 illustrated in FIG. 3.

In this example, the semi-flexible wrap and waterproof sleeve 302, 306 are configured and arranged in 2 simple loops that are generally perpendicular to each other. The first loop is a vertical loop that encompasses a full 360 degree wrap around the rod handle 302 or rod blank 306. The second loop is a horizontal loop that encompasses a full 360 degree wrap around the vertical component of the semi-flexible wrap and waterproof sleeve itself directly above the vertical loop. This horizontal loop provides a key aspect of the engagement method that prevents slippage of the semi-flexible wrap and waterproof sleeve 302, 306.

Understanding the underlying forces imposed by the rod and reel on either of the semi-rigid wraps and waterproof sleeves 302, 306 takes us back to Newton's $2^{nd}$ law, but this time expanded to 2-dimensional axes to allow for the separation of the forces imposed on each of the 2 loops illustrated in the wrapping technique of FIG. 3. The governing equation of which can be expressed by:

Total force=Mass×Acceleration×Cosine($\Theta$)+Mass× Acceleration×Sine($\Theta$)

Where $\Theta$ is the angle between the vertical loop and the acceleration force, gravity. In the case of the engaged semi-rigid wrap and waterproof sleeve illustrated in FIG. 3, $\Theta$=0 degrees, since the force of gravity always points in the direction straight down. This leads to a Cosine($\Theta$)=1 for the vertical component while Sine($\Theta$)=0 for the horizontal force imposed by the rod and reel. This indicates that, as long as the angle ($\Theta$) is near 0 degrees, essentially all of the load is born by the vertical loop and almost none born by the horizontal loop. This illustrates why the two perpendicular loops illustrated in FIG. 3 can provide each apparatus with both the necessary strength and ability to not slip while engaged.

A third aspect of the engagement in a preferred embodiment is that it should be easy to engage and disengage with a single hand. This aspect of the embodiment is satisfied by the fact that neither the simple vertical nor horizontal loops result in any knot of the semi-rigid wrap and waterproof sleeve, so the wrapping can easily be performed with only one hand.

FIGS. 2 and 3 both show two support apparatus attached to the same apparel device, but the embodiment could also be implemented with support apparatus on two or more apparel devices. For example, one support apparatus could be attached to a wading belt while the other is attached to a fishing vest.

Figure 4:
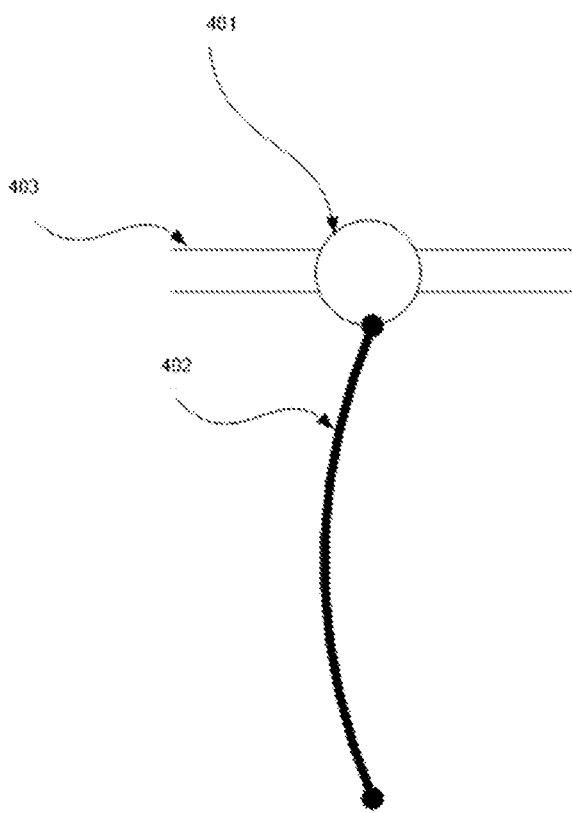
FIG. 4 illustrates an example of the rod support apparatus with a hook and loop strap to provide connection to fishing apparel.
Figure 5:
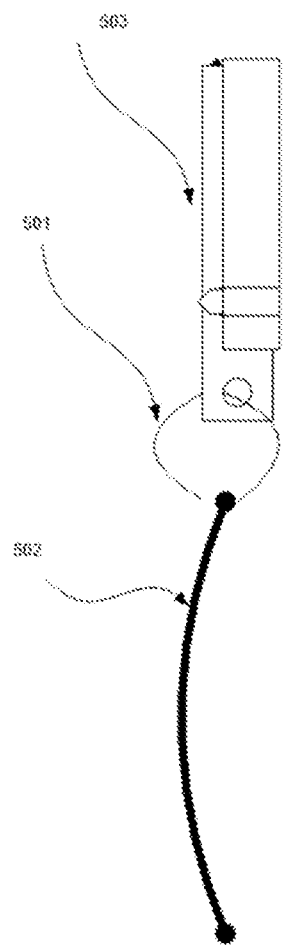
FIG. 5 illustrates an example of the rod support apparatus with a spring clip to provide connection to fishing apparel.

FIGS. 4 and 5 show two possible connection methods to existing apparel that may not contain built in connection points as referenced in the text for FIG. 1. These two examples should be considered representative of many possible additional connection methods. In FIG. 4, split ring connector 401 with semi-rigid wrap and non-slip waterproof sleeve 402 can utilize a strap of hook and loop fabric 403 to be attached to items such as a wading belt or suspenders.

In FIG. 5, split ring connector 501 semi-rigid wrap and non-slip waterproof sleeve 502 is attached to a spring clip type device 503 which can in turn be attached to apparel types such as waders, vests, coats etc.

Figure 6:
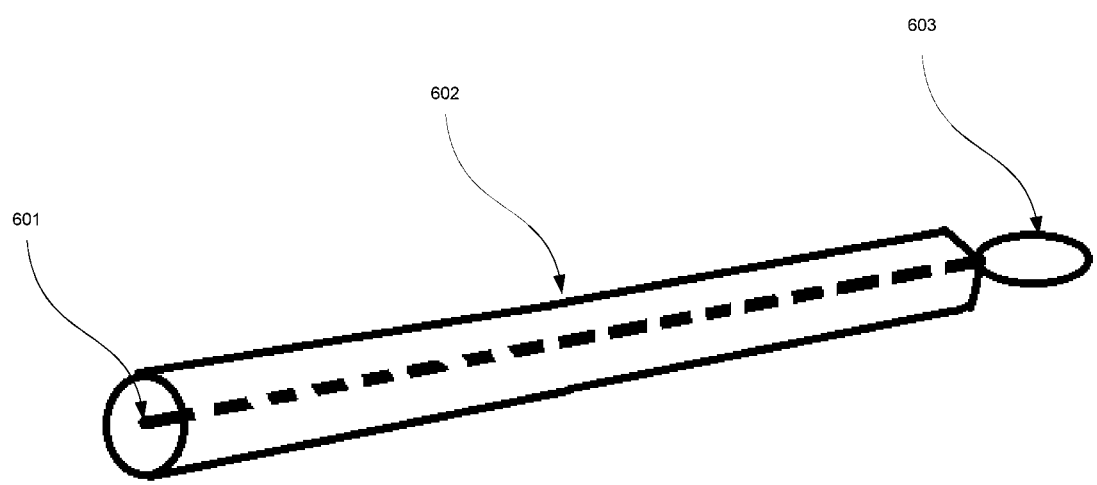
FIG. 6 illustrates an example cross sectional view of one embodiment of a semi-rigid wrap with waterproof sleeve.

FIG. 6 shows a cross-sectional view of an example of the semi-rigid wrap with non-slip waterproof sleeve component of the apparatus. Dotted line 601 represents a length of non-corrosive metal wire of approximately 1 mm to 1.5 mm diameter which provides both strength and flexibility to the semi-rigid wrap. Cylinder 602 represents a length of non-slip tubing that has inner diameter sufficient to house the metal wire 601. The tubing 602 can be constructed of rubber, silicone, polyurethane or other suitable material so as to create the non-slip cushioned waterproof sleeve which comes into contact with the rod when the apparatus is engaged. The loop 603 provides the mechanism for connection of the semi-rigid wrap with non-slip waterproof sleeve to a split ring as shown in FIGS. 1, 4 and 5. The loop 603 can be constructed from the same material as the length of non-corrosive metal wire 601, braided monofilament or other suitable material.

One embodiment of the multipoint wearable fishing rod holder comprises two or more support apparatus of the type shown in FIG. 1, retro fitted temporarily to existing apparel, that utilize various connection methods, some examples of which are shown in FIGS. 1, 4 and 5, to provide at least 2 secure contact points between the fishing rod and the support apparatus, allowing the rod to be held in a generally horizontal direction. This solution enables anglers to add this functionality to their existing fishing apparel and transport the support apparatus between different apparel items as the conditions require.

Another embodiment encompasses any implementation of the support apparatus such that said apparatus is integral within the design and manufacture of a fishing apparel item, including, but not limited, to fishing vests, chest packs, lanyards, waders, wading belt, suspenders, coats etc., so as to provide said fishing apparel with added functionality allowing said fishing apparel to act as a multipoint rod holder.

Another embodiment is a method of engaging and disengaging a plurality of support apparatus that utilizes semi-rigid wrap and non-slip waterproof sleeve as the contact and support point for a fishing rod holder, as described herein.

The present invention contemplates that many changes and modifications may be made. For example, one or more features of the embodiments described herein may be combined to create additional embodiments which are not depicted. Therefore, while an embodiment of the improved fishing rod holder has been shown and described, and a number of alternatives discussed, persons skilled in this art will readily appreciate that various additional changes and modifications may be made without departing from the spirit of the invention, as defined and differentiated by the following claims

What is claimed is:

1. A method of securing a fishing rod to a multipoint fishing rod holder apparatus, said method comprising the steps of:

providing a fishing rod;

holding said fishing rod in a horizontal orientation with a first hand;

providing a flexible, elongated semi-rigid wrap within an elongated non-slip waterproof sleeve, wherein said semi-rigid wrap within said non-slip waterproof sleeve is of sufficient length to be wrapped around a portion of said fishing rod;

utilizing a second hand to wrap said semi-rigid wrap within said non-slip waterproof sleeve completely around a portion of said fishing rod in a vertical plane, forming a vertical loop;

utilizing said second hand to wrap the semi-rigid wrap within said non-slip waterproof sleeve completely around itself in the horizontal plane above the vertical loop of the handle or blank;

holding the fishing rod in said second hand in a horizontal orientation;

utilizing said first hand to wrap another semi-rigid wrap within a non-slip waterproof sleeve completely around a different portion of the fishing rod in the vertical plane, forming a vertical loop; and utilizing the second hand to wrap the semi-rigid wrap within said non-slip waterproof sleeve completely around itself in the horizontal plane directly above the vertical loop, such that said fishing rod remains suspended when hands holding said fishing rod are released.

2. The method of claim 1, further comprising the steps of:

grasping said fishing rod in said first hand;

utilizing said second hand to unwrap the semi-rigid wrap within said non-slip waterproof sleeve from a blank portion of the fishing rod;

switching hands to hold the fishing rod in the second hand;

utilizing said first hand to unwrap the semi-rigid wrap within said non-slip waterproof sleeve from a handle of said fishing rod; and repeating said unwrapping until all semi-rigid wraps within said non-slip waterproof sleeves are disconnected from said fishing rod.

* * * * *